(No Model.)
J. F. PACKER.
PLOW CLEVIS.
No. 440,648. Patented Nov. 18, 1890.
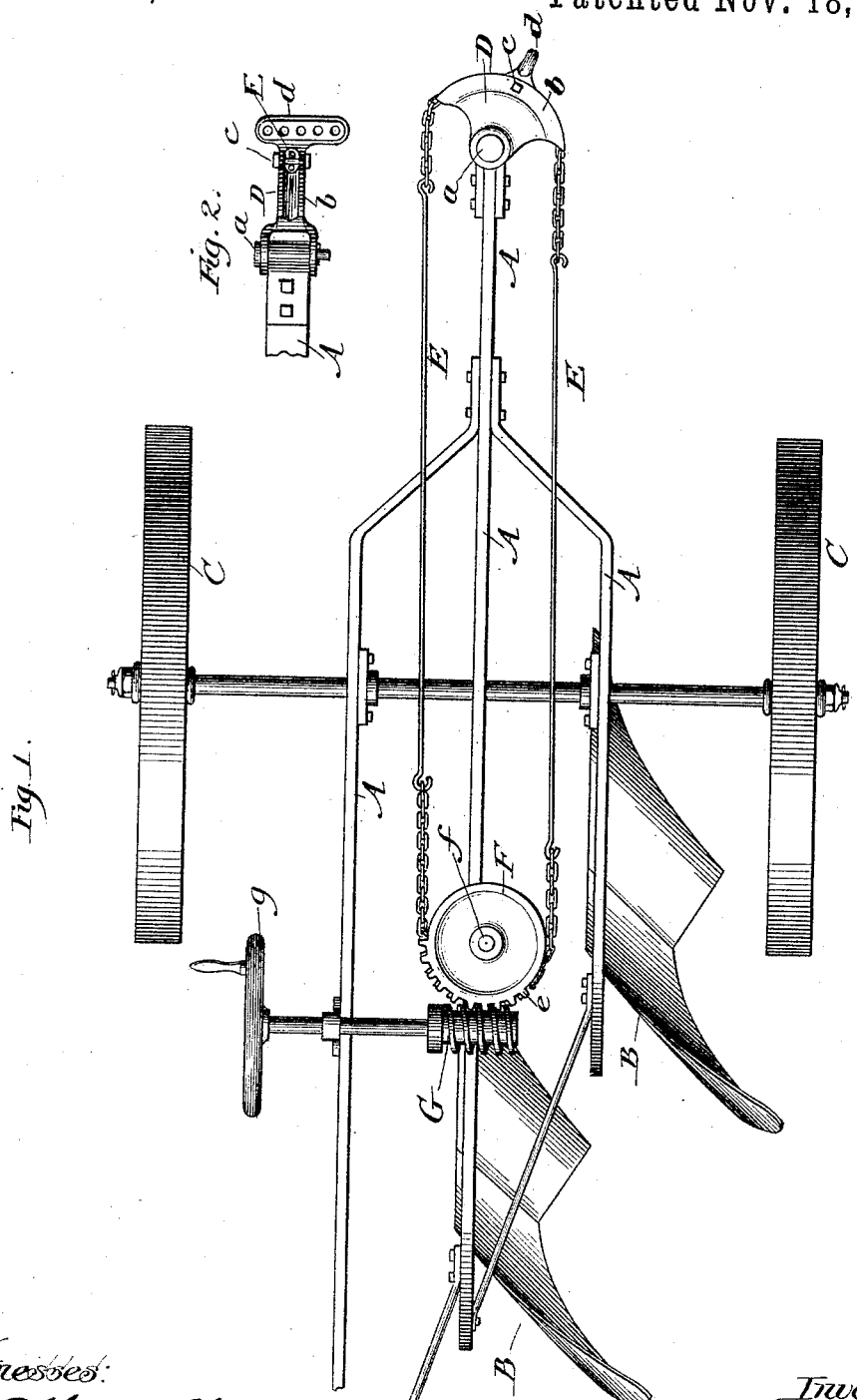
Witnesses:
Albert H. Adams.
Harry T. Jones.
Inventor:
John F. Packer

UNITED STATES PATENT OFFICE.

JOHN F. PACKER, OF CHICAGO, ILLINOIS, ASSIGNOR TO THE DAVID BRADLEY MANUFACTURING COMPANY, OF SAME PLACE.

PLOW-CLEVIS.

SPECIFICATION forming part of Letters Patent No. 440,648, dated November 18, 1890.

Application filed April 5, 1890. Serial No. 346,706. (No model.)

*To all whom it may concern:*

Be it known that I, JOHN F. PACKER, residing at Chicago, county of Cook, and State of Illinois, and a citizen of the United States, have invented a new, useful, and Improved Shiftable Clevis for Sulky and Gang Plows, of which the following is a specification, reference being had to the accompanying drawings, in which—

Figure 1 is a top or plan view of a plow with the clevis applied, and Fig. 2 is a side elevation of the clevis.

The object of this invention is to provide a shiftable clevis and devices for shifting it for sulky and gang plows, whereby the plow may be made to cut a wider or narrower furrow, which I accomplish as illustrated in the drawings, and as hereinafter described.

That which I claim as new will be pointed out in the claim.

In the drawings, A represents a plow-beam or plow-frame.

B represents the plow or plows attached to the beam or frame A.

C C represent the carrying-wheels.

D is a shiftable clevis pivotally attached to the forward end of the beam or frame A by a vertical bolt or pivot-pin $a$. This clevis D is provided with a vertical plate $d$, having adjusting-holes for attaching the evener. This clevis also has a bearing-surface $b$ for a connecting-chain E, which surface is preferably made in the form of a segment, and the chain is secured thereon by a pin $c$.

F is a wheel or disk mounted upon a pivot $f$ at the rear of the frame or beam A. The periphery of the wheel or disk F, or a portion of it, is provided with teeth $e$, and may be provided with sprockets for the chain E.

G is a worm mounted in suitable bearings on the frame A and engaging with the teeth $e$ of the wheel or disk F. It may be rotated by a hand-wheel $g$ or other suitable device.

The connection between the shiftable clevis D and wheel or disk F may be a chain, or a chain and links, or other suitable connection.

This device may be applied to a sulky-plow having a single plow or to a gang-plow. When it is applied to a sulky-plow with a single plow, it is applied to the beam.

The wheel or disk F and hand-wheel $g$ may be arranged on any convenient part of the frame or beam A, the position shown being the most convenient.

The operation is as follows: When the operator desires to cause the single plow, or the forward plow of the gang-plow, to cut a wider furrow, the clevis D is shifted to the right, as shown by Fig. 1, by turning the worm G by the hand-wheel $g$. When it is desired to cause the single plow, or the forward plow of the gang-plow, to cut a narrower furrow, the clevis D is shifted in the opposite direction. By means of the worm-gear G the wheel or disk F can be rotated or partially rotated to shift the clevis D very quickly and readily, and the worm G will hold the wheel or disk F in the shifted position until again operated.

What I claim as new, and desire to secure by Letters Patent, is—

The combination, with a plow beam or frame, of a shiftable clevis, a wheel or disk F, worm G, and connections between the wheel and clevis, substantially as and for the purpose specified.

JOHN F. PACKER.

Witnesses:
HARRY T. JONES,
ALBERT H. ADAMS.